United States Patent
Aten (10) Patent No.: US 9,725,183 B2
(45) Date of Patent: Aug. 8, 2017

(54) PYLON WITH NOISE ATTENUATING FAIRING

(71) Applicant: Rohr, Inc., Chula Vista, CA (US)

(72) Inventor: Michael Aten, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 42 days.

(21) Appl. No.: 14/746,439

(22) Filed: Jun. 22, 2015

(65) Prior Publication Data

US 2016/0368616 A1  Dec. 22, 2016

(51) Int. Cl.
*F02K 1/34* (2006.01)
*B64C 7/02* (2006.01)
*B64D 29/02* (2006.01)

(52) U.S. Cl.
CPC .............. *B64D 33/06* (2013.01); *B64C 7/02* (2013.01); *B64D 29/02* (2013.01)

(58) Field of Classification Search
CPC .......................... B64D 33/06; B64D 29/02
See application file for complete search history.

(56) References Cited

U.S. PATENT DOCUMENTS

| | | | |
|---|---|---|---|
| 4,465,725 A | 8/1984 | Riel | |
| 4,539,244 A | 9/1985 | Beggs et al. | |
| 4,671,841 A | 6/1987 | Stephens | |
| 4,743,740 A | 5/1988 | Adee | |
| 4,820,117 A | 4/1989 | Larrabee et al. | |
| 5,927,647 A | 7/1999 | Masters et al. | |
| 7,784,283 B2 | 8/2010 | Yu | |
| 7,923,668 B2 | 4/2011 | Layland et al. | |
| 8,800,917 B2 * | 8/2014 | Machado | B64C 7/02 244/53 R |
| 8,827,199 B2 | 9/2014 | Aeberli et al. | |
| 8,991,749 B2 | 3/2015 | Dravet et al. | |
| 2008/0217468 A1 | 9/2008 | Fol | |
| 2011/0219788 A1 | 9/2011 | Zimmermann et al. | |

* cited by examiner

Primary Examiner — Brian M O'Hara
(74) Attorney, Agent, or Firm — O'Shea Getz P.C.

(57) ABSTRACT

A pylon is provided for connecting a propulsion system to an aircraft. The pylon includes a structure configured to structurally tie the propulsion system to the aircraft. The pylon also includes a pylon fairing configured to house and provide an aerodynamic cover for the structure. A lower aft fairing segment of the pylon fairing includes a plurality of apertures. The apertures are fluidly coupled with a sealed, sound attenuating chamber within the pylon.

18 Claims, 7 Drawing Sheets

PYLON WITH NOISE ATTENUATING FAIRING

BACKGROUND OF THE INVENTION

1. Technical Field

This disclosure relates generally to noise attenuation for an aircraft propulsion system and, more particularly, to noise attenuation of exhaust gas from an aircraft propulsion system.

2. Background Information

Aircraft propulsion system generate low and high frequency noise. There is a continued need in the art to decrease generation of such noise in order to reduce, among other things, noise disturbances near airports.

SUMMARY OF THE DISCLOSURE

According to an aspect of the present disclosure, a pylon is provided for connecting a propulsion system to an aircraft. The pylon includes a structure configured to structurally tie the propulsion system to the aircraft. The pylon also includes a pylon fairing configured to house and provide an aerodynamic cover for the structure. A lower aft fairing segment of the pylon fairing includes a plurality of apertures. The apertures are fluidly coupled with a sealed, sound attenuating chamber within the pylon.

According to another aspect of the present disclosure, an aircraft system is provided that includes an aircraft propulsion system including a core gas path. The aircraft system also includes a pylon connected to the aircraft propulsion system. The pylon includes a pylon fairing with a lower aft fairing segment configured to guide core gas exhausted from the core gas path. The lower aft fairing segment includes a plurality of apertures which are fluidly coupled with a sealed, sound attenuating chamber within the pylon.

Another fairing segment of the pylon fairing may be configured to guide air flowing around the aircraft propulsion system.

The lower aft fairing segment may include metal and/or the other fairing segment may include composite material.

The lower aft fairing segment may extend laterally between opposing fairing sides and vertically to a fairing bottom end which extends laterally between the fairing sides. At least some of the apertures may be disposed on a first of the fairing sides.

Some of the apertures may be disposed on a second of the fairing sides.

Some of the apertures may be disposed on the fairing bottom end.

The lower aft fairing segment may extend laterally between opposing fairing sides and vertically to a fairing bottom end which extends laterally between the fairing sides. At least some of the apertures may be disposed on the fairing bottom end.

The pylon may be configured such that the chamber is operable to attenuate sound having a frequency between about four-hundred Hertz and about eight-hundred Hertz.

The lower aft fairing segment may include metal. Another fairing segment of the pylon fairing, which is adjacent to the lower aft fairing segment, may include composite material.

The lower aft fairing segment may be configured to guide core gas exhausted from a core gas path of the propulsion system.

The lower aft fairing segment may include a core between a first face sheet and a second face sheet. A plurality of pores in the core may be fluidly coupled between a plurality of first perforations in the first face sheet and a plurality of second perforations in the second face sheet. The pores, the first perforations and the second perforations may form the apertures.

At least one baffle may be disposed within the chamber that divides the chamber into a plurality of cavities.

The foregoing features and the operation of the invention will become more apparent in light of the following description and the accompanying drawings.

DETAILED DESCRIPTION OF THE INVENTION

Figure 1:
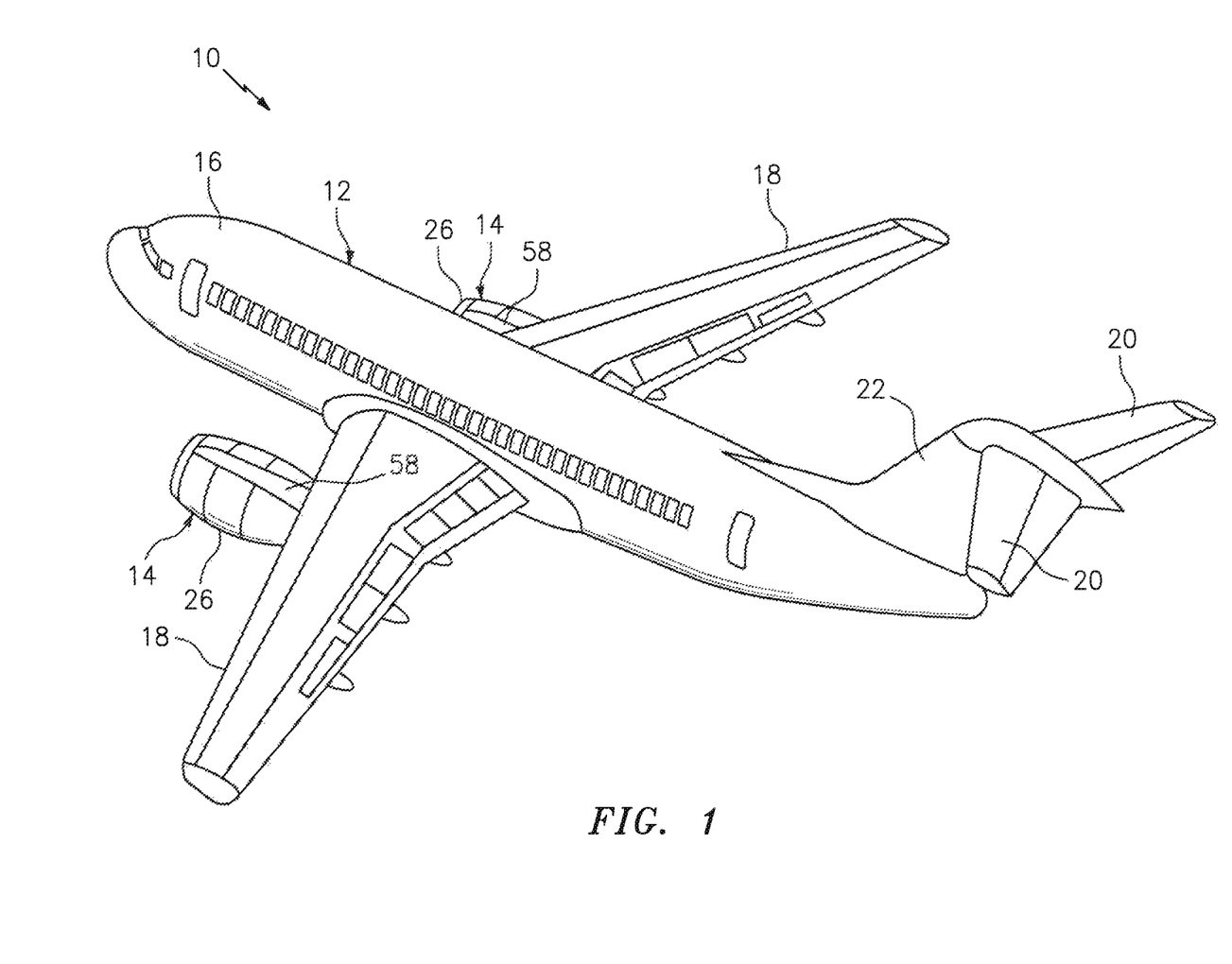
FIG. 1 is a perspective illustration of an aircraft system according to an embodiment of the present disclosure.

FIG. 1 illustrates a typical prior art aircraft 10 which includes an airframe 12 and a plurality of aircraft propulsion systems 14.

The airframe 12 includes a fuselage 16 and a plurality of wings 18 and 20. The wings include main or general lift wings 18 and stabilizer wings 20. The wings 18 are disposed on and connected to opposing sides of the fuselage 16. The wings 20 are disposed on and connected to opposing sides of a tail 22, which extends out from an aft portion of the fuselage 16. However, the present disclosure is not limited to any particular airframe types or configurations.

Figure 2:
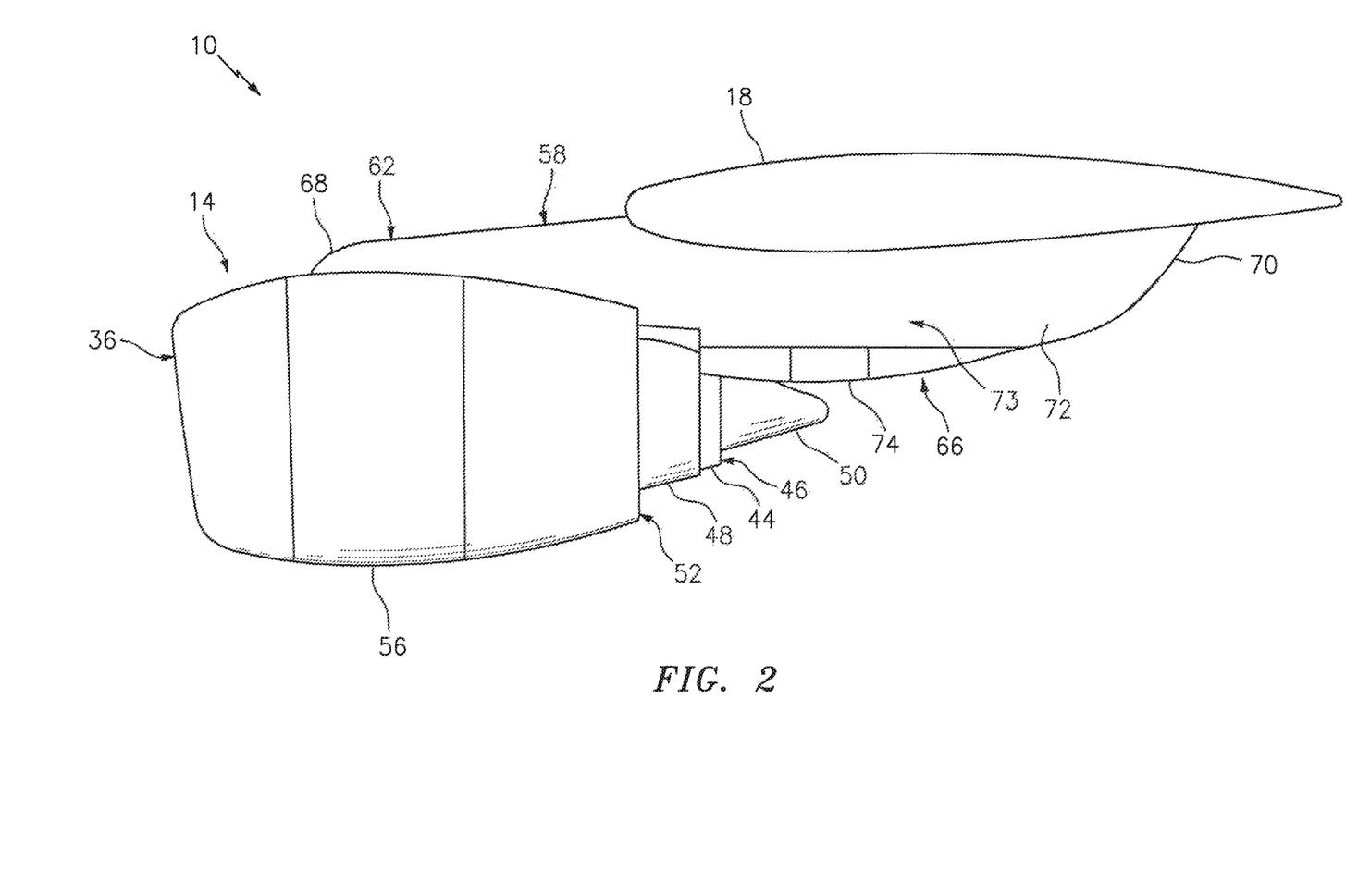
FIG. 2 is a side illustration of the propulsion system mounted to a wing by a pylon.
Figure 3:
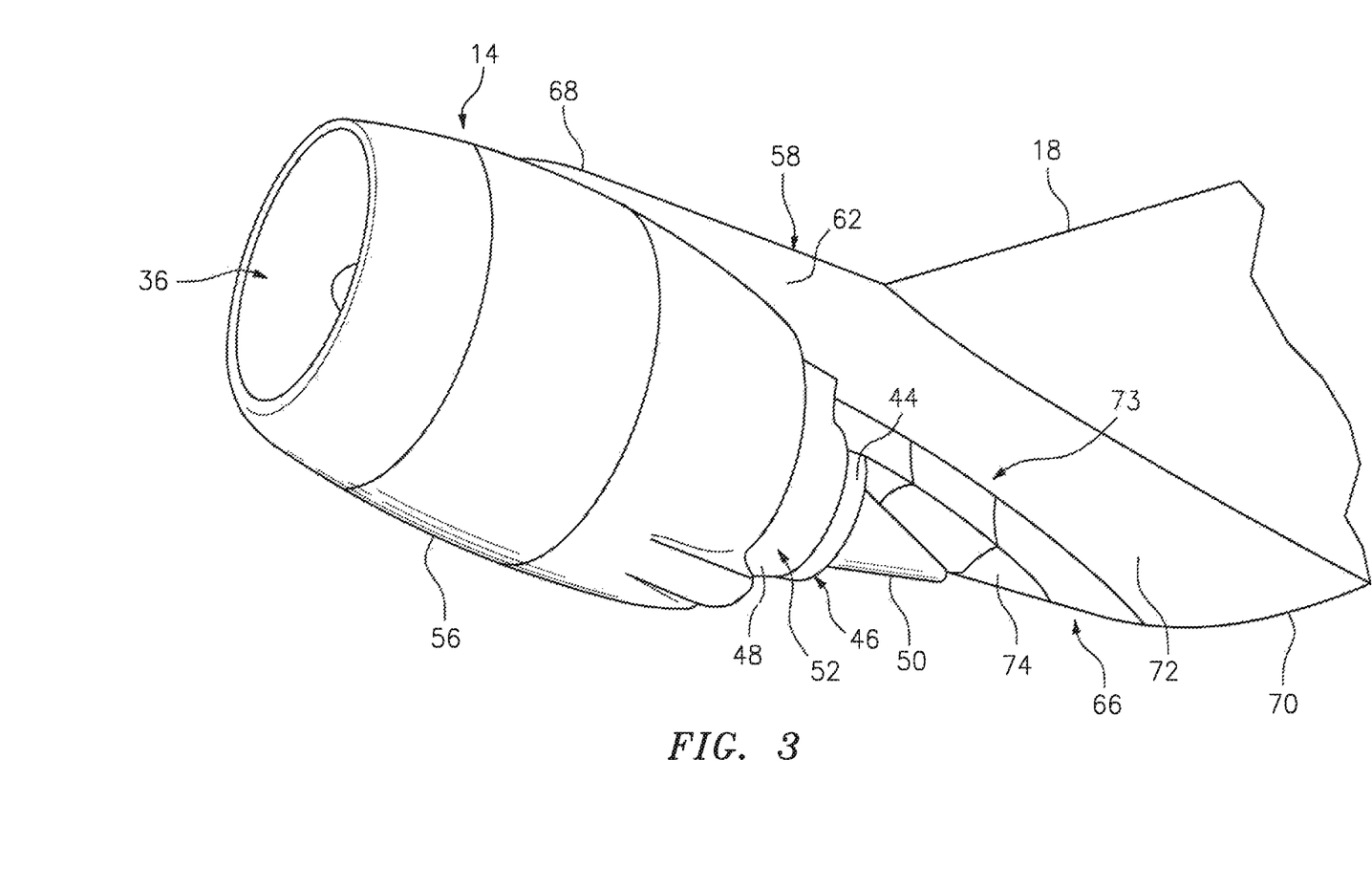
FIG. 3 is a perspective illustration of the propulsion system mounted to the wing by the pylon.

Referring to FIGS. 2 and 3, a typical prior art nacelle and pylon system for an under-wing mounted turbofan propulsion system is illustrated. Each propulsion system 14 is mounted under a respective one of the wings 18 by a pylon 58. Of course, in other embodiments, one or more of the propulsion systems 14 may each be mounted to another portion of the airframe 12 (e.g., the aft section of the fuselage 16, etc.) by its pylon 58.

Each propulsion system 14 includes an outer nacelle structure 56 that forms an external, aerodynamic fairing around the propulsion system and serves many other purposes. In actuality, the outer nacelle structure 56 may be formed of separate aero-structures such as an inlet module, a fan cowl module, and a thrust reverser module. But, the present disclosure is not limited to any particular construction of outer nacelle structure 56. The propulsion system 14 has in inlet 36 where air is drawn in and divided into two distinct flow paths, a core air flow and a fan bypass air flow. As is known, the fan bypass air flow exits at a high velocity and relatively low temperature at a bypass air nozzle 52 formed between the outer nacelle structure 56 and an inner nacelle structure 48, and the core air flow exits at a high velocity and relatively high temperature at a core air nozzle 46 formed between an exhaust nozzle 44 and an exhaust center body 50.

Referring to FIG. 2, each pylon 58 includes an internal pylon structure (not shown) configured to structurally support a respective one of the propulsion systems 14. Various internal pylon structure types and configurations are known in the art, and the present disclosure is not limited to any particular one thereof.

Each pylon 58 also includes a pylon fairing 62 which houses and provides an aerodynamic covering for the internal pylon structure. More particularly, the pylon fairing 62 wraps around the internal pylon structure and extends from generally from the intersection of the pylon with the propulsion system 14 to the intersection of the pylon with the wing 18. The pylon fairing 62 may include multiple pieces, removable covers, etc. The pylon fairing 62 typically also includes a lower aft fairing segment 66. While the remainder of the pylon fairing 62 may be conveniently and economically made of composite materials, low temperature tolerant metals, thermoplastics, etc., the lower aft fairing segment 66 is made from a material that can withstand high temperature because it is exposed to the high temperature core air that passes through the core air exhaust nozzle 46. Typical materials for the lower aft fairing segment include titanium or nickel rich alloys such as Inconel.

The lower aft fairing segment 66 typically comprises the underside 74 of the pylon 58 and a few inches of the inboard and outboard sides, respectively, of the pylon extending generally upward from the underside 74. In the fore-aft direction, the lower aft fairing segment 66 typically runs from the same station as the exhaust nozzle 44 to the aft-most portion of the pylon 58 underside where it intersects the pylon trailing edge 70 which sweeps upward toward the wing 18. As is demonstrated by the shape of the lower aft fairing segment 66 illustrated in FIGS. 2 and 3, the lower aft fairing segment 66 may be generally outlined as only those pylon external surfaces that may be washed by the high temperature core air exhaust.

The lower aft fairing segment 66 is configured to guide core gas, which is exhausted through the exhaust nozzle 46, aft away from the propulsion system 14 and below the pylon 58. For example, a bottom portion of the lower aft fairing segment 66 (i.e., the underside 74) is arranged approximately at an outer periphery of a core gas exhaust stream. The lower aft fairing segment 66 of FIGS. 2 and 3 is also configured to guide bypass air, which is exhausted from the core gas path through the bypass air nozzle 52, aft away from the propulsion system 14 and around the pylon 58. For example, opposing side portions of the lower aft fairing segment 66 are arranged at least partially within and thereby bisects a bypass air exhaust stream.

The engine core may produce noise that exits through the exhaust nozzle 46. This noise is often characterized as low frequency noise, and the dominant tones may be between from about 400 to 800 Hz, in an exemplary engine. Airline operators are increasingly motivated, due to regulatory pressures or other factors, to reduce noise emissions from airliners.

Figure 5:
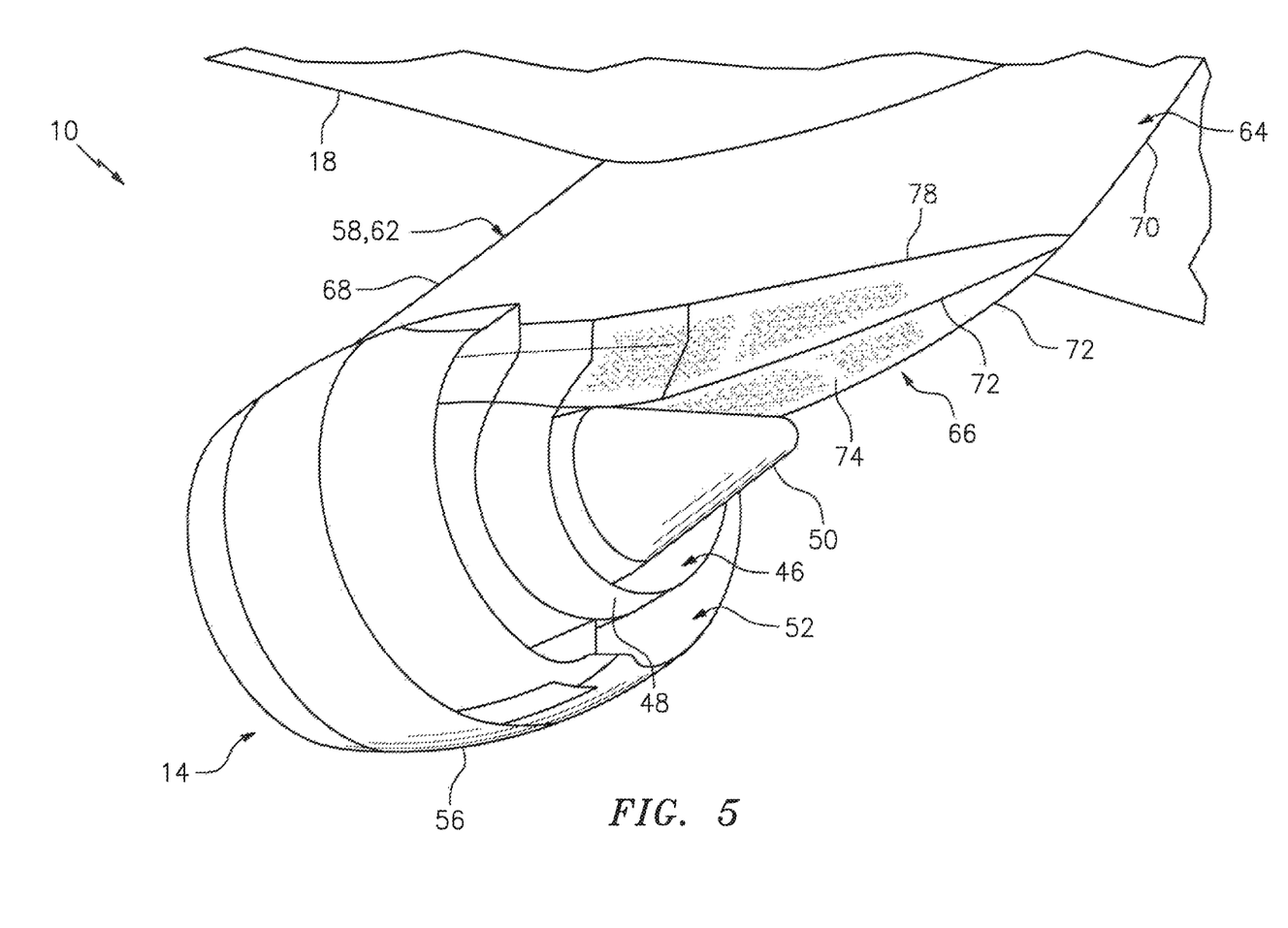
FIG. 5 is another perspective illustration of the propulsion system mounted to the wing by the pylon.

FIG. 5 illustrates a lower aft fairing segment 66 according to the present invention which incorporates noise attenuating features and may be especially adapted to attenuate the low frequency engine noise from the exhaust nozzle. At least a portion of the lower aft fairing 66 external skin is perforated to allow sound waves in the air to transfer through the skin. On the other side of the skin are formed sealed chambers capable of resonating to produce sound waves that return through the skin and destructively interfere with noise sound waves from the engine.

Figure 4:
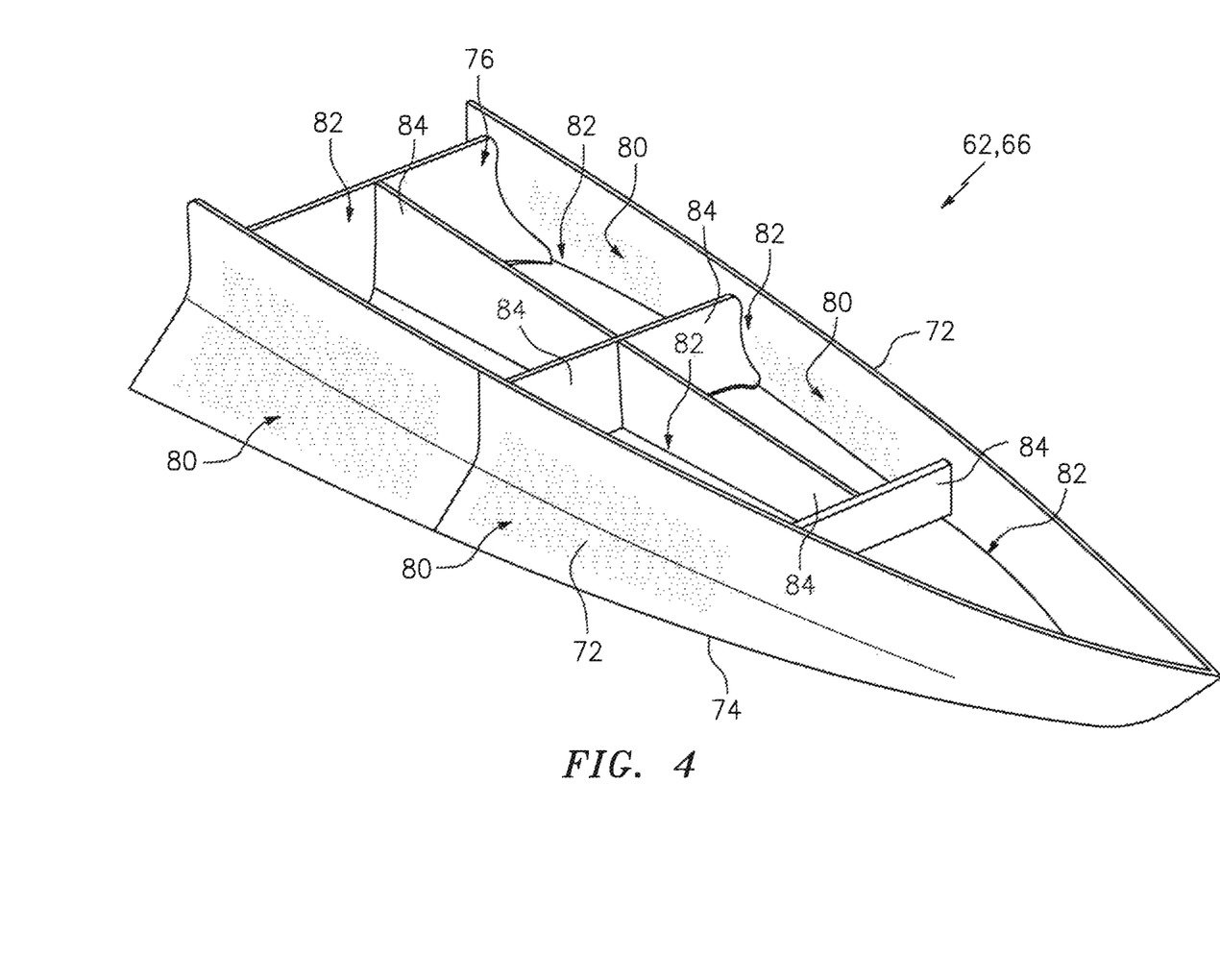
FIG. 4 is a perspective illustration of a lower aft fairing segment of the pylon.
Figure 6:
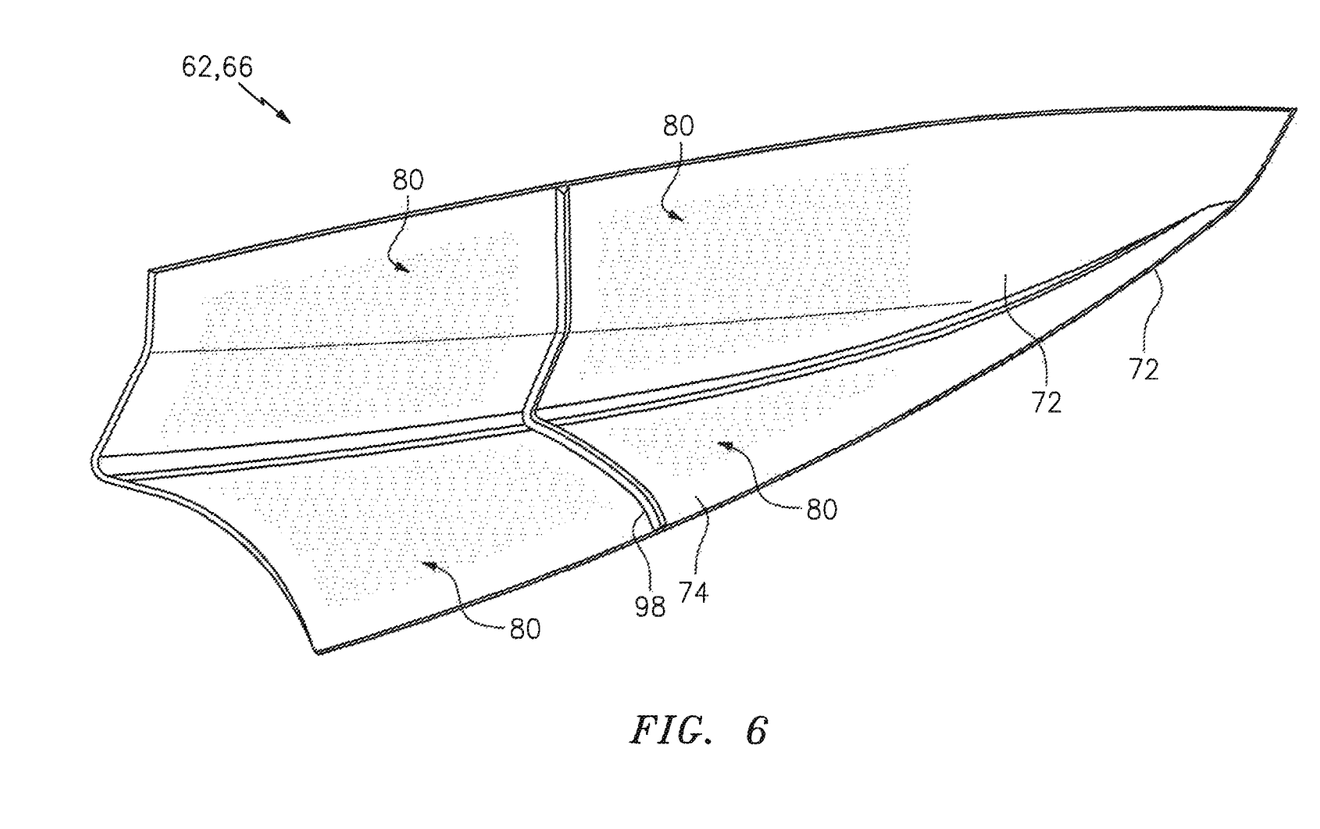
FIG. 6 is another perspective illustration of the lower aft fairing segment of the pylon.

In one embodiment shown in FIG. 4, the lower aft fairing segment 66 helps form an internal chamber 76 configured as a sealed, sound attenuating chamber. Here, the term "sealed" may describe a chamber which is substantially or completely closed off to other adjacent cavities and/or passages within the pylon 58, but not necessarily air tight. However, in some embodiments, the sealed chamber 76 may also be fluidly coupled with a vacuum and/or a conduit to a low pressure plenum in order to reduce pressure within the chamber 76. Referring to FIGS. 4 and 6, the internal chamber 76 is configured as a sound attenuating chamber by fluidly coupling the chamber 76 with one or more apertures 80 (e.g., through-holes) in the lower aft fairing segment 66. Note, for ease of illustration, the apertures are represented by blocks 80 in the drawings.

An array of apertures 80 (e.g., through-holes) may be configured in the lower aft fairing segment 66 on the underside 74. An array of apertures 80 may also or alternatively be configured in the lower aft fairing segment 66 on one or both the fairing sides 72. In this manner, sound waves traveling with one or more of the exhaust streams may travel through a wall of the lower aft fairing segment 66 and into the chamber 76.

Referring to FIG. 6, the chamber 76 may be divided into two or more sub chambers or cavities 82 (e.g., sub-chambers) via one or more baffles 84 included within the pylon 58. These baffles 84 may partially fluidly separate the cavities 82. Alternatively, the baffles 84 may completely fluidly separate the cavities 82. The dimensions and overall volume of the cavities 82 will determine the frequency of noise that the chambers are capable of attenuating. The space inside of the pylon 58 around the lower aft fairing segment 66 allows for fairly large cavities 82 to be formed, in order to attack low frequency noise emissions from the engine. The dimensions and overall volume of individual cavities 82 may be different from one another so that each attacks a different range of noise frequencies, achieving in aggregate a broad band noise attenuation. Individual cavities 82 may also be partially separated by mesh or perforated septums in order to form a double degree of freedom resonating chamber to attack two ranges of noise frequencies. Individual cavities 82 might also be joined together to form folded cavities to attenuate low frequencies. U.S. Pat. No. 7,784,283 to Yu et al, describes cavities that are similarly formed in an exhaust center body structure and are large cavities designed to attenuate low frequency engine noise. The same types of cavities described therein may likewise and in a similar fashion be formed inside the pylon 58 with the perforations formed through the lower aft pylon fairing segment 66. Accordingly, the disclosure of the '283 patent is hereby incorporated herein by reference in its entirety.

Figure 7:
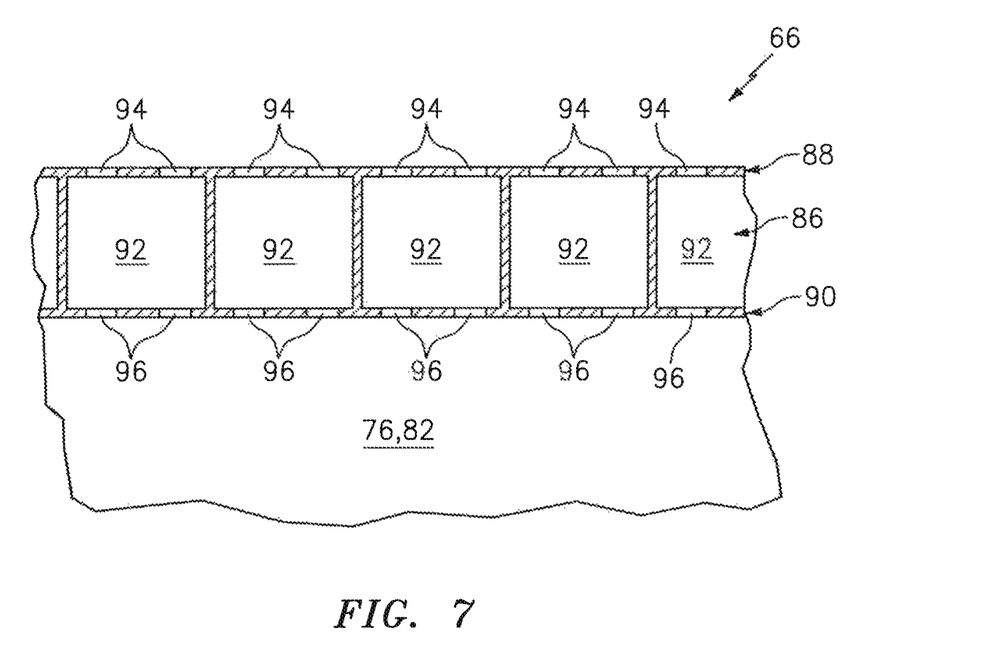
FIG. 7 is a sectional illustration of a portion of a wall of the lower aft fairing segment.

In some embodiments, the wall of the lower aft fairing segment 66 may be configured as a solid panel or panels. In other embodiments, the wall may be configured as a composite panel or panels. For example, referring to FIG. 7, at least a portion of the wall of the lower aft fairing segment 66 may be configured with a porous core 86 between perforated first and second face sheets 88 and 90; here, the sheet 90 may functions as a septum. The core 86 may be configured as a honeycomb core, or another porous structure. The core 86 includes a plurality of pores 92 (e.g., cavities) which are fluidly coupled with a plurality of first perforations 94 (e.g., through-holes) in the first face sheet 88 and a plurality of second perforations 96 (e.g., through-holes) in the second face sheet 90. The pores 92 and perforations 94, 96 collectively form the apertures 80 through the wall. The wall of the lower aft fairing segment 66, of course, is not limited to the foregoing exemplary embodiments. For example, in other embodiments, the wall may also include a septum to provide the wall with a double-degree-of-freedom acoustic panel structure.

In some embodiments, one or both the fairing sides 72 may each include at least one acoustic panel in, for example, region 73 (see FIGS. 2 and 3). This acoustic panel, for example, may be positioned above the lower aft fairing segment 66 and configured to attenuate relatively high frequency noise. The acoustic panel may have a similar configuration to the wall panel shown in FIG. 7 except for providing the second face sheet 90 without perforations. More particularly, the acoustic panel may have a porous core (e.g., a honeycomb core) between an exterior perforated face sheet and a non-perforated back sheet.

In some embodiments, referring to FIG. 6, the wall of the lower aft fairing segment 66 may include at least one split-line 98; inter-panel joint. Such a split line 98 may accommodate thermal expansion and contraction of the wall while reducing internal stresses within the wall.

The lower aft fairing segment 66 may be configured from a high-temperature material such as, but not limited to, metal. Examples of a metal are titanium, nickel and alloys thereof. The lower aft fairing segment 66 of the present disclosure, however, is not limited to the foregoing exemplary materials. For example, in other embodiments, the lower aft fairing segment 66 may also or alternatively be constructed from high temperature composites such as ceramic matrix composites or metal matrix composites.

The terms "upstream", "downstream", "inner", "outer", "bottom", "top", "vertical", etc. are used to orientate the components of the pylon 58 described above relative to the aircraft propulsion system 14 and the aircraft. A person of skill in the art will recognize, however, one or more of these components may be utilized in other orientations than those described above. For example, where the aircraft propulsion system 14 is mounted to a side of the aircraft, the vertical direction described above may be horizontal relative to a gravitational horizon. The pylon 58 of the present disclosure therefore is not limited to any particular spatial orientations.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. A pylon for connecting a propulsion system to an aircraft, the pylon comprising:
   a structure configured to structurally tie the propulsion system to the aircraft;
   a pylon fairing configured to house and provide an aerodynamic cover for the structure, the pylon fairing including a fairing wall and a lower aft fairing segment of the pylon fairing including a plurality of apertures extending through the fairing wall; and
   one or more baffles disposed within the pylon fairing;
   wherein the fairing wall and one or more baffles define a sealed, sound attenuating chamber within the pylon.

2. The pylon of claim 1, wherein the pylon is configured such that the chamber is operable to attenuate sound having a frequency between about four-hundred Hertz and about eight hundred Hertz.

3. The pylon of claim 1, wherein
   the lower aft fairing segment extends laterally between opposing fairing sides and vertically to a fairing bottom end which extends laterally between the fairing sides; and
   at least some of the apertures are disposed on a first of the fairing sides.

4. The pylon of claim 3, wherein some of the apertures are disposed on a second of the fairing sides.

5. The pylon of claim 3, wherein some of the apertures are disposed on the fairing bottom end.

6. The pylon of claim 1, wherein
   the lower aft fairing segment extends laterally between opposing fairing sides and vertically to a fairing bottom end which extends laterally between the fairing sides; and
   at least some of the apertures are disposed on the fairing bottom end.

7. The pylon of claim 1, wherein
   the lower aft fairing segment comprises metal; and
   another fairing segment of the pylon fairing, which is adjacent to the lower aft fairing segment, comprises composite material.

8. The pylon of claim 1, wherein the lower aft fairing segment is configured to guide core gas exhausted from a core gas path of the propulsion system.

9. The pylon of claim 1, wherein
   the lower aft fairing segment comprises a core between a first face sheet and a second face sheet;
   a plurality of pores in the core are fluidly coupled between a plurality of first perforations in the first face sheet and a plurality of second perforations in the second face sheet; and
   the pores, the first perforations and the second perforations form the apertures.

10. A pylon for connecting a propulsion system to an aircraft, the pylon comprising:
    a structure configured to structurally tie the propulsion system to the aircraft;
    a pylon fairing configured to house and provide an aerodynamic cover for the structure, a lower aft fairing segment of the pylon fairing including a plurality of apertures, wherein the apertures are fluidly coupled with a sealed, sound attenuating chamber within the pylon; and
    at least one baffle disposed within the chamber that divides the chamber into a plurality of cavities;
    wherein the pylon fairing comprises a fairing wall;
    wherein the apertures extend through the fairing wall;
    wherein an exterior side of the fairing wall partially forms an exterior surface of the pylon fairing; and
    wherein an interior side of the fairing wall, which opposes the exterior side, partially defines the sound attenuating chamber.

11. The pylon of claim 1, wherein the pylon fairing is configured such that
    first sound waves are capable of traveling through the apertures and into the sound attenuating chamber; and the sound attenuating chamber is operable to resonate in response to receiving the first sound waves and thereby produce second sound waves that travel out of the sound attenuating chamber through the apertures to destructively interfere with other sound waves outside of the pylon fairing.

12. An aircraft system, comprising:
an aircraft propulsion system including a core gas path;
a pylon connected to the aircraft propulsion system, the pylon including a pylon fairing with a lower aft fairing segment configured to guide core gas exhausted from the core gas path, wherein the lower aft fairing segment includes a plurality of apertures which are fluidly coupled with a sealed, sound attenuating chamber within the pylon; and
at least one baffle disposed within the chamber that divides the chamber into a plurality of cavities;
wherein the pylon fairing comprises a fairing wall;
wherein the apertures extend through the fairing wall;
wherein an exterior side of the fairing wall partially forms an exterior surface of the pylon fairing; and
wherein an interior side of the fairing wall, which opposes the exterior side, partially defines the sound attenuating chamber.

13. The aircraft system of claim 12, wherein another fairing segment of the pylon fairing is configured to guide air flowing around the aircraft propulsion system.

14. The aircraft system of claim 13, wherein the lower aft fairing segment comprises metal and the other fairing segment comprises composite material.

15. The aircraft system of claim 12, wherein
the lower aft fairing segment extends laterally between opposing fairing sides and vertically to a fairing bottom end which extends laterally between the fairing sides; and
at least some of the apertures are disposed on a first of the fairing sides.

16. The aircraft system of claim 12, wherein
the lower aft fairing segment extends laterally between opposing fairing sides and vertically to a fairing bottom end which extends laterally between the fairing sides; and
at least some of the apertures are disposed on the fairing bottom end.

17. The aircraft system of claim 12, wherein the pylon is configured such that the sound attenuating chamber passively attenuates noise.

18. The aircraft system of claim 12, wherein the pylon is configured such that
first sound waves are capable of traveling through the apertures and into the sound attenuating chamber; and
the sound attenuating chamber is operable to resonate in response to receiving the first sound waves and thereby produce second sound waves that travel out of the sound attenuating chamber through the apertures to destructively interfere with other sound waves outside of the pylon.

* * * * *